US012633683B2

(12) United States Patent
Boling et al.

(10) Patent No.: US 12,633,683 B2
(45) Date of Patent: May 19, 2026

(54) GROUNDING CONNECTOR

(71) Applicant: ERICO International Corporation, Solon, OH (US)

(72) Inventors: Dale Boling, Avon, OH (US); Christian Barcey, Streetsboro, OH (US); Thomas Bendlak, Macedonia, OH (US); Brent Wilmoth, Cuyahoga Falls, OH (US); Gregory Dean Holder, Chagrin Falls, OH (US)

(73) Assignee: ERICO International Corporation, Solon, OH (US)

(*) Notice: Subject to any disclaimer, the term of this patent is extended or adjusted under 35 U.S.C. 154(b) by 412 days.

(21) Appl. No.: 18/326,638

(22) Filed: May 31, 2023

(65) Prior Publication Data

US 2023/0387612 A1 Nov. 30, 2023

Related U.S. Application Data

(60) Provisional application No. 63/347,274, filed on May 31, 2022.

(51) Int. Cl.
*H01R 4/36* (2006.01)

(52) U.S. Cl.
CPC ..................................... *H01R 4/36* (2013.01)

(58) Field of Classification Search
CPC ....................................................... H01R 4/36
USPC ........................................................ 439/811
See application file for complete search history.

(56) References Cited

U.S. PATENT DOCUMENTS

| | | | |
|---|---|---|---|
| 2,471,957 A | 5/1949 | Hubbard | |
| 3,963,322 A | 6/1976 | Gryctko | |
| 5,129,844 A | 7/1992 | Goto et al. | |
| 6,042,430 A | 3/2000 | Hollick | |
| 6,084,188 A | 7/2000 | Mueller et al. | |
| 6,402,544 B1 | 6/2002 | Barnett | |
| 6,604,882 B2 | 8/2003 | Gordon et al. | |
| 6,875,045 B1 | 4/2005 | Hollick | |
| 7,214,108 B2 * | 5/2007 | Barnett | H01R 4/307 439/797 |
| 7,967,972 B2 | 6/2011 | Glass et al. | |
| 9,172,167 B2 | 10/2015 | Keeven et al. | |

(Continued)

FOREIGN PATENT DOCUMENTS

| | | | |
|---|---|---|---|
| AU | 2007201069 B2 | 2/2010 | |
| DE | 623406 C * | 12/1935 | H01R 4/36 |

(Continued)

*Primary Examiner* — Tulsidas C Patel
*Assistant Examiner* — Jeffrey Mountain
(74) *Attorney, Agent, or Firm* — Quarles & Brady LLP

(57) ABSTRACT

A grounding connector can include a connector body and a shear bolt. The connector body can have a recess sized to receive one or more conductors and a threaded portion. The shear bolt can be sized to engage the threaded portion of the connector body to secure the one or more conductors within the recess. When the shear bolt is tightened into the threaded portion of the connector body, the shear bolt can retain the one or more conductors within the recess. When the shear bolt is subject to a shear torque, a head of the shear bolt can shear from a body of the shear bolt. The shear torque can correspond to a target compression force applied between the shear bolt and the one or more conductors.

20 Claims, 12 Drawing Sheets

(56) References Cited

U.S. PATENT DOCUMENTS

| | | | | |
|---|---|---|---|---|
| 9,929,477 | B2 | 3/2018 | Beiler et al. | |
| 10,573,979 | B2 | 2/2020 | Toivanen et al. | |
| 10,700,449 | B2 | 6/2020 | Serre et al. | |
| 11,193,522 | B2 | 12/2021 | Veerapathiran et al. | |
| 11,258,188 | B2 | 2/2022 | Toivanen et al. | |
| 2020/0040930 | A1* | 2/2020 | Peltier | H01R 4/36 |
| 2022/0099131 | A1 | 3/2022 | Barezzani | |
| 2022/0145923 | A1 | 5/2022 | Dossmann et al. | |
| 2024/0162664 | A1* | 5/2024 | Holder | H01R 13/652 |

FOREIGN PATENT DOCUMENTS

| | | | | |
|---|---|---|---|---|
| DE | 4323434 | C1 | 2/1995 | |
| DE | 10313944 | A1 | 10/2004 | |
| DE | 102012103672 | A1 | 10/2013 | |
| DE | 102008041263 | B4 | 1/2014 | |
| EP | 599346 | B1 | 7/1997 | |
| EP | 1376764 | A2 * | 1/2004 | H01R 4/307 |
| EP | 692643 | B2 | 3/2005 | |
| EP | 3454421 | A1 | 3/2019 | |
| ES | 1272559 | Y | 10/2021 | |
| GB | 2174851 | B | 10/1988 | |
| GB | 2305549 | B | 1/1998 | |
| GB | 2328087 | A | 2/1999 | |
| PL | 237953 | B1 | 6/2021 | |

* cited by examiner

GROUNDING CONNECTOR

CROSS REFERENCE TO RELATED APPLICATIONS

This application claims priority to and incorporates by reference U.S. provisional patent application No. 63/347,274, filed May 31, 2022.

BACKGROUND

In different contexts, it may be beneficial (e.g., required by code standards) to provide electrical grounding for conductors. To provide grounding connections, for example, grounding connectors can secure wires or other conductors (e.g., cables) to a conductive body (e.g., a part of the grounding connector, in turn connected to a grounding rod or other grounded component), to provide a mechanically secured electrical grounding connection (i.e., connection to electrical ground) for the conductors.

SUMMARY

In some aspects, a grounding connector assembly may include a connector body that may include a recess extending in an axial direction from a blind end, and an internal thread extending in the axial direction. The recess may include a recess opening to a lateral side of the connector body, relative to the axial direction, which may define a lay-in entrance. The lay-in entrance may receive one or more conductors into the recess in an insertion direction that may be transverse to the axial direction. The grounding connector assembly may further include a shear bolt that can be engaged with the internal thread of the connector body in axial alignment with the recess, such that the shear bolt may be threadedly movable into the recess to engage the one or more conductors. The shear bolt may have a shear torque at which a head of the shear bolt may be configured to shear from a body of the shear bolt. The shear torque may correspond to a target compression force between the shear bolt and the one or more conductors. The shear bolt may be tightened into the internal thread of the connector body so that the body of the shear bolt may retain the one or more conductors at the blind end of the recess.

In some aspects, the recess may be formed as a slot that extends into the connector body and may include: a first portion that may extend parallel to the axial direction, a bend, and a second portion that may extend laterally from the bend to the lateral side of the connector body and the lay-in entrance.

In some aspects, the slot may intersect the internal thread and may exhibit a first width that may be smaller than an inner diameter of the internal thread.

In some aspects, the slot may extend axially away from the lay-in entrance past an axial end of the internal thread.

In some aspects, the connector body may integrally include a conductor portion that may at least partly include the recess and an overhang portion that may be on an axially opposite side of the lay-in entrance than the conductor portion.

In some aspects, the overhang portion may include the internal thread.

In some aspects, the internal thread of the overhang portion may extend over an axial length that may secure the shear bolt to the connector body in a staged orientation, in which the shear bolt may be oriented to permit the one or more conductors to be inserted into or removed from the recess via the lay-in entrance.

In some aspects, conductor portion may include the internal thread.

In some aspects, relative to respective reference planes that may be perpendicular to the axial direction, the overhang portion may define a cross-sectional profile that may be substantially identical to a cross-sectional profile of the conductor portion.

In some aspects, the cross-sectional profiles may be circular, hexagonal, or both.

In some aspects, the shear bolt may further include a cap between the body and the head, the cap may extend laterally farther than the internal thread and may provide a stop against over-insertion of the shear bolt into the recess.

In some aspects, the connector body may be secured to a grounding rod that may extend axially from the connector body in an opposite direction than the shear bolt.

In some aspects, the connector body may be threadedly connected to the grounding rod.

In some aspects, a ground connector assembly may include a grounding rod. The grounding connector assembly may further include the connector body that may be engaged at a first end with the grounding rod. The connector body may include at a second end, a threaded portion that may extend in an axial direction, and a recess that may be sized to receive one or more conductors. The recess may open out of the connector body in a lateral direction, relative to the axial direction. A shear bolt may be engaged with the threaded portion of the connector body and may secure the one or more conductors within the recess. A head of the shear bolt may be configured to shear from a body of the shear bolt at a target compression force between the shear bolt and the one or more conductors. The target compression force may retain the one or more conductors within the recess.

In some aspects, the recess may be formed as a slot that may extend into the connector body. The connector body may include a first portion that may extend parallel to the axial direction. The first portion may define slot openings at opposing lateral sides of the connector body. A second portion may extend laterally from the first portion to the lay-in entrance.

In some aspects, the connector body may exhibit a circular cross-section along the recess and a hexagonal cross-section at an end axially opposite from the head of the shear bolt.

In some aspects, the recess may define a lay-in opening in the lateral direction that may receive the one or more conductors. The second end of the connector body may extend axially past the lay-in opening and may include at least part of the threaded portion.

In some aspects, the threaded portion at the second end of the connector body may be cantilevered to be axial alignment with the recess.

In some aspects, a method of establishing a grounding connection may include, providing a connector body that may include a recess that may extend in an axial direction from a blind end. The connector body may further include an internal thread that may extend in the axial direction. The connector body may further include the recess that may open to a lateral side of the connector body, relative to the axial direction. The recess may define a lay-in entrance. The method may further include inserting one or more conductors laterally into the lay-in entrance in an insertion direction that may be transverse to the axial direction. The method may further include moving the one or more conductors axially within the recess to seat the one or more conductors at a blind end of the recess. The method may further include tightening a shear bolt into the internal threads of the connector body, which may threadedly move the shear bolt in the axial direction to engage the one or more conductors within the recess. The method may further include tightening the shear bolt to a shear torque, which may shear a head of the shear bolt from a body of the shear bolt. The shear torque may correspond to a target compression force between the shear bolt and the one or more conductors so that the body of the shear bolt may retain the one or more conductors at the blind end of the recess.

In some aspects, the shear bolt may be retained by the threaded portion of the connector body as the one or more conductors are inserted into the lay-in entrance.

In some aspect, a grounding connector assembly can include a connector body and a shear bolt. The connector body can include a first end and a second end, the second end including a threaded portion with an internal thread extending in an axial direction, and a recess sized to receive one or more conductors. The recess can open out of the connector body in a lateral direction, relative to the axial direction. The shear bolt can be engaged with the threaded portion of the connector body to secure the one or more conductors within the recess. A head of the shear bolt can be configured to shear from a body of the shear bolt at a shear torque corresponding to a target compression force between the shear bolt and the one or more conductors to retain the one or more conductors within the recess.

Other aspects of the grounding connector and the grounding assembly, including features and advantages thereof, will become apparent to one of ordinary skill in the art upon examination of the figures and detailed description herein. Therefore, all such aspects of the are intended to be included in the detailed description and this summary.

DETAILED DESCRIPTION

Figure 1:
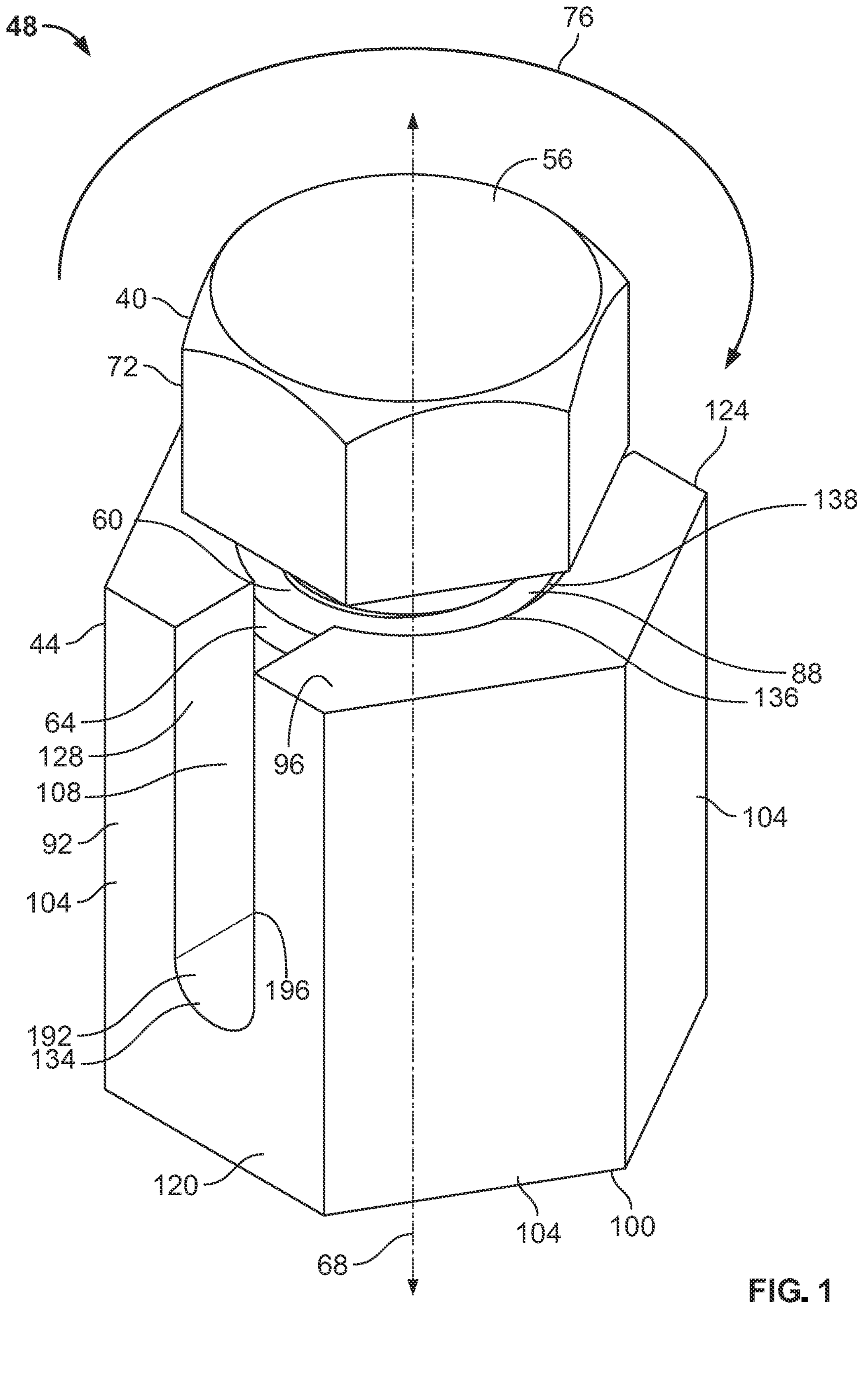
FIG. 1 is an isometric view of an example grounding connector according to the disclosed technology, with a connector body and a shear bolt having a head and a body.

The present disclosure and accompanying figures relate generally to grounding connectors, including grounding connectors that utilize shear bolts and lay-in grounding connectors. Although examples of grounding connectors are disclosed with reference to particular installation contexts, the concepts of the grounding connectors may be applied to a wide range of applications.

As generally noted above, grounding connections for conductors can be useful in a variety of contexts. To ensure appropriate grounding connections, it is important to appropriately mechanically secure conductors to grounding connectors. For example, some code requirements may require that grounding connectors provide at least a minimum force to detach grounded conductors from the grounding connector (e.g., a minimum permissible pull-out load). During installation of conventional grounding connectors, however, it may be difficult for users to ensure appropriately secure connections with the relevant conductors using available tools. Further, engagement of existing connectors is often generally reversible, and can result in lower security or lower durability grounding connections.

In this regard, some examples disclosed herein can include grounding connectors with fasteners configured to readily provide appropriately secure grounding connections for one or more conductors. For example, some grounding connectors disclosed herein can include a shear bolt that is configured to be tightened into threaded engagement with a grounding body of the connector. A head of the shear bolt can be configured to be automatically sheared off of a shaft (or other body portion) of the shear bolt upon loading of the head (and the bolt) with a torque that corresponds to the shaft of the shear bolt appropriately securing one or more conductors to the grounding body (e.g., securing the one or more conductors against at least a threshold pull-out force). Thus, for example, an appropriate grounding connection can be reliably established without requiring specialized tools. Further, in a tightened and sheared state, the shear bolt may effectively result in an irreversible grounding connection.

In some cases, it may be helpful to install grounding connectors for conductors that have already themselves been installed in a larger assembly or system, as may make stab-through installation of the conductors difficult. Thus, for example, some examples disclosed herein can be configured as lay-in grounding connectors. For example, a grounding connector can include a notch, groove, or other recess that is open to receive one or more conductors via an aperture of the recess. In this type of arrangement, the recess can also be aligned with (e.g., partly include) a set of threads arranged to engage a bolt (e.g., a shear bolt) to secure one or more conductors within the recess.

In some cases, a recess of a lay-in grounding connector can extend toward an axial end of a grounding connector, relative to an axial direction defined by threads for a bolt that secures the relevant conductor(s) to the grounding connector (e.g., can extend linearly to a top of the grounding connector, relative to gravity, in an installed orientation). Thus, for example, one or more conductors can be installed into a grounding connector in a similar direction as a shear bolt is moved to engage or release the one or more conductors In some cases, a recess of a lay-in grounding connector can extend to a lateral side of a grounding connector, relative to an axial direction defined by the threads for the bolt. Thus, for example, one or more conductors can be installed into a grounding connection in an insertion direction that is transverse (e.g., perpendicular) to a direction in which a shear bolt is moved to engage the one or more conductors. In such a case, for example, a grounding connection can include an overhanging end portion that is configured to stage a bolt during installation operations (i.e., temporarily retain the bolt in an installation position), including as one or more conductors are moved into or out of the relevant recess within which the conductor(s) can be retained by the bolt, once the bolt is tightened.

In the illustrated example of FIG. 1, a shear bolt 40 is received within a connector body 44, thereby forming a grounding connector 48. The shear bolt 40 may include a head 56, a shear segment 60 and a body 64 (e.g., a threaded shaft as shown in the illustrated example). The shear segment 60 may be configured to connect the head 56 to the body 64. The shear segment 60 may include a cross-sectional geometry that is distinct from a cross-sectional geometry of the shear bolt 40 and/or head 56.

Generally, the shear bolt 40 is configured so that shear forces separate the head 56 from the body 64 at the shear segment 60 upon application of at least a threshold torque. In particular, in the illustrated example, a first axis 68 intersects the head 56 and the body 64. The head 56 may define a first or head surface 72 configured to receive a tool (e.g., a conventional wrench, not shown) so that a rotational force 76 about the first axis 68 can be transferred from the tool, through the first surface 72 to the head 56. When the magnitude of the rotational force 76 reaches a certain degree or level of force, the head 56 can be accordingly sheared from the body 64. In this regard, the shear bolt can be configured so that the shear torque is at a pre-determined value at which the head 56 may be desired to be sheared from the body 64 (e.g., to ensure appropriate clamping force for grounding, as further discussed below).

The body 64 may include a first external thread 88. The first external thread 88 may extend axially along the first axis 68, and may be configured to secure the shear bolt 40 to the connector body 44. The shear bolt 40 can be secured to the connector body 44 by the first set of threads 88 of the body 64. The connector body 44 also has an outer peripheral surface 92 that extends between a first end 96 opposite a second end 100, and at least one side face 104 positioned between the first end 96 and the second end 100 (e.g., multiple faces to provide a hexagonal or other polygonal cross-sectional profile).

Still referring to FIG. 1, the shear bolt 40 can be in at least two states. In a first or pre-shear state (see FIG. 1) the head 56 and the body 64 may be connected by the shear segment 60. The shear bolt 40 in the pre-shear state may be secured to the connector body 44 in a staged orientation. In the staged orientation, the body 64 of the shear bolt 40 may be partly received at by the recess 108, but the body 64 may not yet apply sufficient compression force to conductors.

Figure 2:
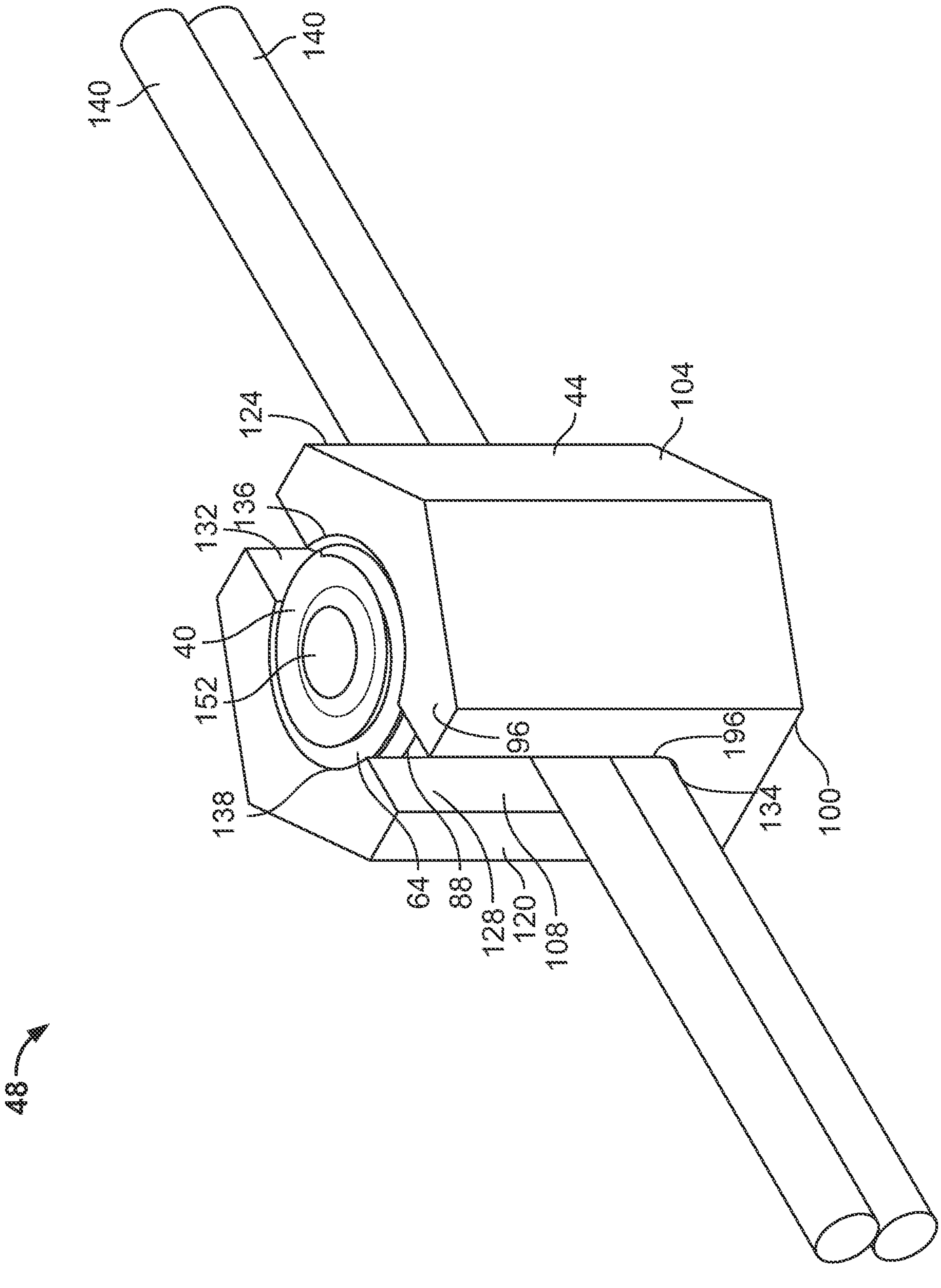
FIG. 2 is an isometric view of the grounding connector of FIG. 1 with two conductors retained in a grounded configuration.

In contrast, referring to FIG. 2, in a tightened or sheared state, the head 56 of the shear bolt 40 can be sheared from the body 64, with conductors 140 thereby secured to the connector body 44 with a desired compressive force. Further, because the head 56 has been removed, it may be relatively difficult to remove the shear bolt 40 from the connector body 44 or otherwise loosen the engagement with the conductors 140.

Still referring to FIG. 2, in the illustrate example, the at least one side face 104 of the connector body 44 includes a first face 120 and a second face 124 opposite from the first face 120. The first face 120 may include a first recess opening 128 while the second face 124 may include a second recess opening 132. Correspondingly, a recess 108 may extend from the first recess opening 128 to the second recess opening 132, configured to receive one or more conductors. In some examples, the recess 108 may extend axially from the first end 96 toward the second end 100. In some examples, the recess 108 may extend only partway along the connector body 44 from the first end 96 toward the second end 100. For example, as shown, the recess 108 may extend to a blind end 134 within each of the recess openings 128, 132. In some examples, the recess 108 may extend across the connector body 44, transverse to the first axis 68, from the first recess opening 128 to the second recess opening 132. In some examples, the recess 108 may extend from the first recess opening 128 to the second recess opening 132 diametrically across the grounding connector body 44. In some examples, the recess 108 may extend from the first recess opening 128 to the second recess opening 132 non-linearly (e.g., to support angled or curved conductors).

Generally, the recess 108 may extend along a cavity 136 disposed between the first recess opening 128 and the second recess opening 132 (e.g., centrally along the connector body 44). The cavity 136 may include a cavity opening 138 disposed on the first end 96 configured to receive the shear bolt 40. The cavity opening 138 may be circular, or any other shape (e.g., square, elliptical, triangular, etc.) In some examples, the cavity 136 may be cylindrical, configured to receive the body 64 of the shear bolt 40. In some examples, the cavity 136 may include a second internal thread 139 configured to receive the first external thread 88 of the shear bolt 40. In some examples, the second internal thread 139 may be only partly coextensive with the cavity 136 along the axial direction.

Figure 4:
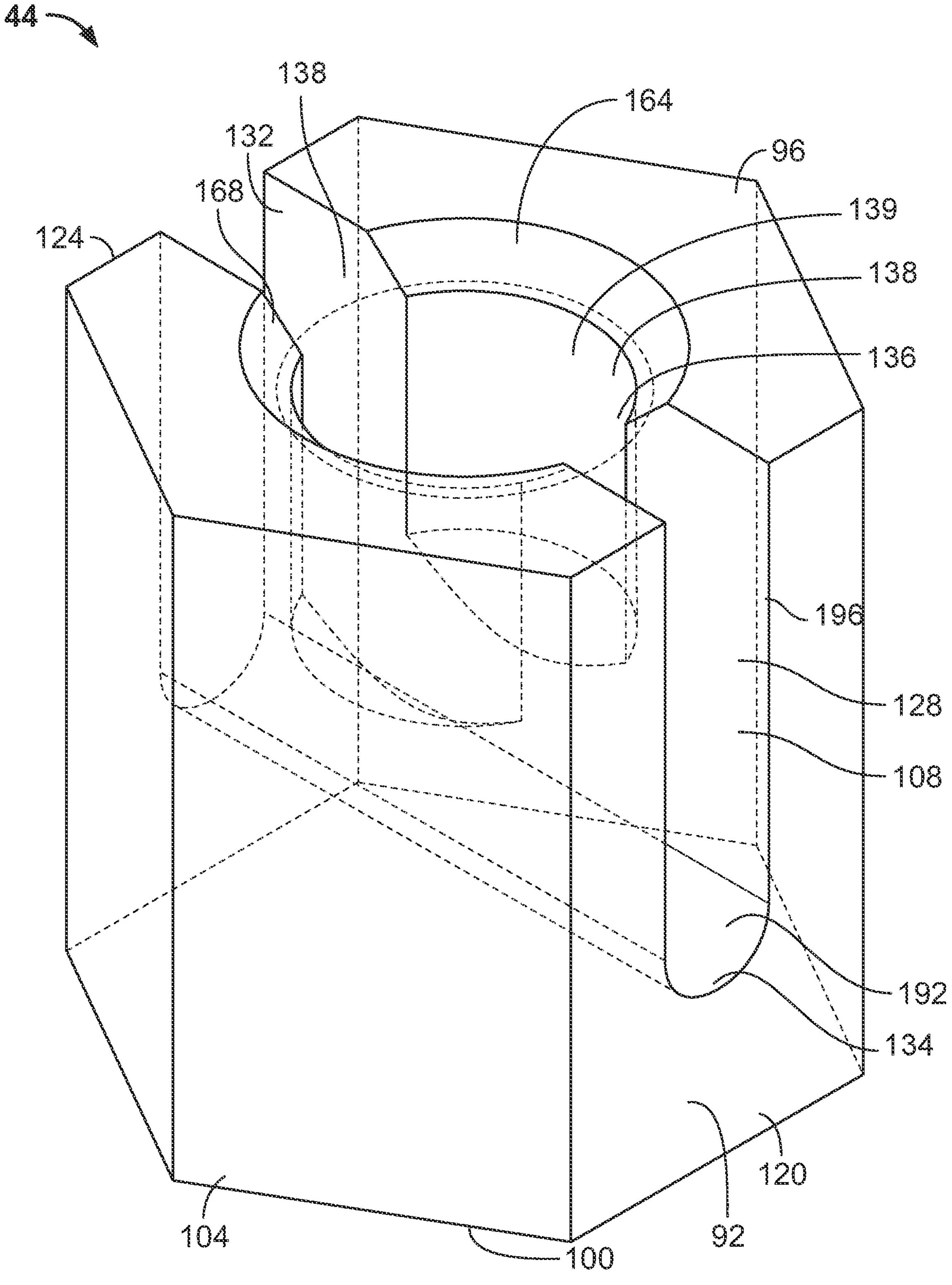
FIG. 4 is an isometric view of a connector body suitable for use with the grounding connector of FIG. 1, rendered transparent to illustrate a recess thereof.

Referring to FIG. 4, in some examples, the cavity 136 may be only partly coextensive with the recess 108 along the axial direction. For example, the cavity 136 may extend axially from the first end 96 toward the second end 100 by less than the recess 108. In other words, an axial length of the cavity 136, extending from the first end 96 toward the second end 100, may be less than an axial length of the recess 108 also extending from the first end 96 toward the second end 100. In some examples, the cavity 136 may have a diameter that may be larger than a width of the recess 108, e.g., a width of the first recess opening 128 or the second recess opening 132 circumferentially around the peripheral surface 92. In other words, the cavity 136 may be wider across than a width of the slot generally along a circumferential direction of the cavity 136, so that the shear bolt 40 may extend fully across the recess 108 (or recess openings 128, 132) when the shear bolt 40 is received into the cavity 136.

Referring to FIG. 2, one or more of the conductors 140 can be positioned or received in the recess 108. The shear bolt 40 may therefore be inserted into the connector body 44 (e.g., tightened using hand tools) via the second internal thread 139 of the cavity 136 to retain the one or more conductors 140 between the shear bolt 40 and the connector body 44.

When the shear bolt 40 is in the pre-shear position, as the rotational force 76 is applied (see FIG. 1), the shear bolt 40 tends to move along the first axis 68 toward the one or more conductors 140. As the shear bolt 40 is thus advanced toward the one or more conductors 140 and begins to urge the conductors 140 into the connector body 44, a pre-determined or target compression force can be reached, between the shear bolt 40 and the one or more conductors 140, to appropriately retain the one or more conductors 140 within the recess 108 (e.g., in accordance with electrical codes or other regulations). Generally, therefore, the shear bolt 40 can be beneficially configured to exhibit a shear torque that is sufficiently large so that the target compression force for the one or more conductors 140 is reached at or before the shear torque is attained, but no so large as to unduly deform the conductors 140. Therefore, when the shear torque is reached and the head 56 is sheared off of the body 64, a user may have confidence that the target compression force has been achieved, but that the conductors 140 are not over-compressed.

When the head 56 is removed, the shear bolt 40 is then in the tightened or sheared position (e.g., as shown in FIG. 2). When the head 56 is removed, a shear surface 152 can be exposed along the shear segment 60. In some examples, the shear surface 152 can be a flat shaped surface, or an uneven (i.e. not flat) shaped surface. In this regard, for example, once the head 56 is sheared off, axially moving the shear bolt 40 within the recess 108 may be relatively difficult, thus even further ensuring that the conductors 140 may remain securely engaged.

Figure 3:
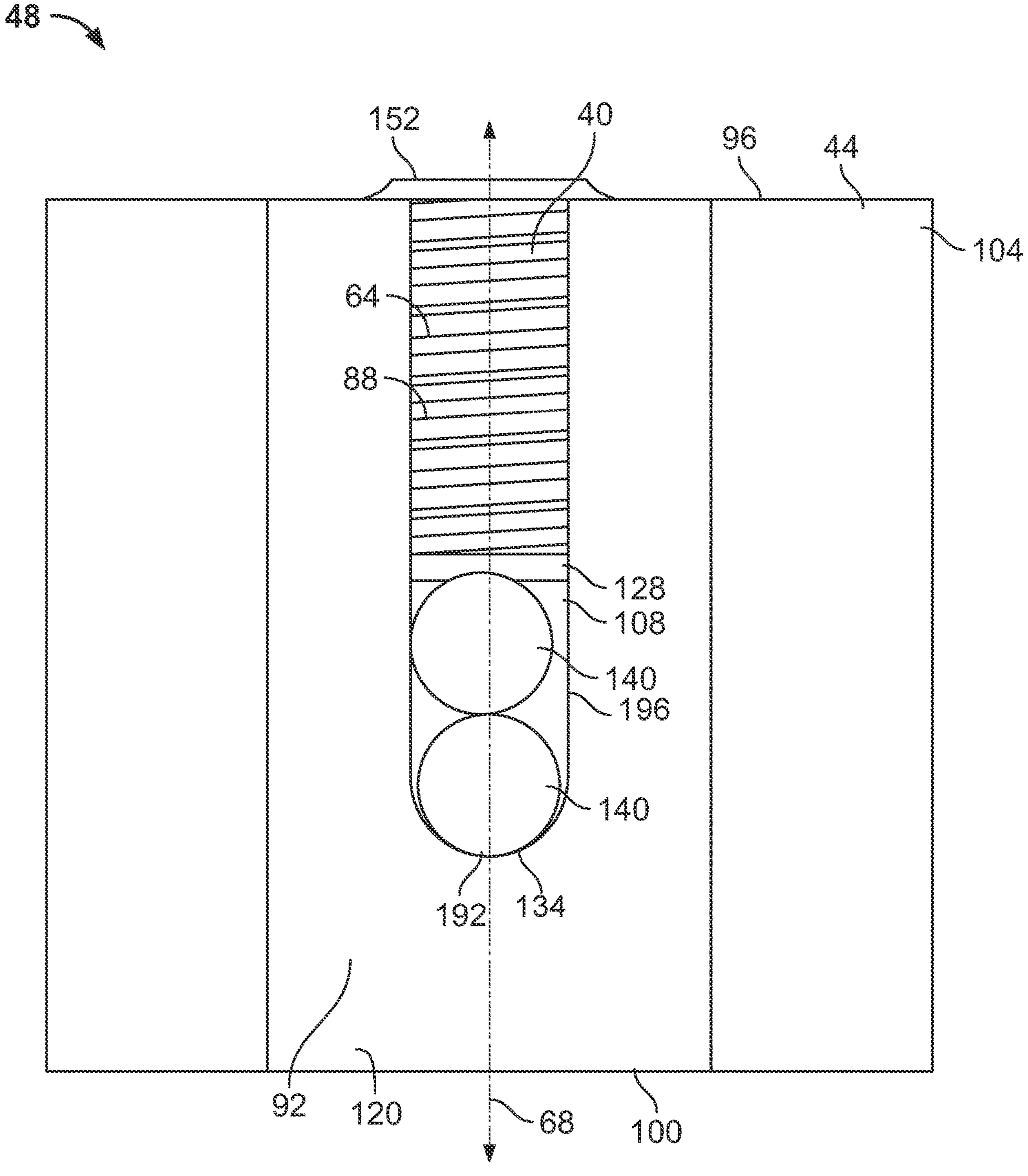
FIG. 3 is a side view of the grounding connector as configured in FIG. 2.

Referring to FIGS. 1 and 3, the at least one side faces 104, including the first face 120 and the second face 124 (see FIG. 2), may be sized and shaped to receive a tool (not shown), including a standard wrench or other similar hand tool. Thus, in some cases, the at least one side faces 104 may be engaged by a tool (not shown) to hold the connector body 44 in a fixed position as the head 56 of the shear bolt 40 is engaged by a different tool to adjust the shear bolt 40 (e.g., to tighten the shear bolt 40 to establish a grounding connection). In some examples, the connector body 44 may have a hexagonal cross-sectional profile (e.g., as may match or be slightly larger than a hexagonal cross-sectional profile of an associated shear bolt). Thus, for example, a shear bolt and a connector body can be readily engaged with standard socket, crescent, or other wrenches. In some examples, one or both ends of the connector body 44 may be flat or planar in shape (e.g., as shown in FIG. 1 for first end 96). In some examples, one or both ends of the connector body 44 may be uneven or non-planar in shape. In some examples, both ends of the connector body 44 may include threaded openings, including as further discussed below.

As discussed above, the connector body may include the recess 108 to receive the one or more conductors, and the recess 108 may include the cavity 136 to receive the shear bolt 40. In some examples, referring to FIGS. 4-6, the cavity 136 may include a first chamfer 164 and a second chamfer 168, as can help to guide a shear bolt into alignment.

In the illustrated example, the first recess opening 128 and the second recess opening 132 of the recess 108 may define a semi-circular (or other) saddle 192 that is shaped and sized to receive the one or more conductors 140 (see FIG. 2) and is continuous from the first opening 128 to the second opening 132. In some examples, the first recess opening 128 and the second recess opening 132 may include sidewalls 196 that are slanted relative to the first axis 68 to better guide conductors into the saddle 192.

Regarding FIGS. 5-9 generally, a variety of alternative configurations and optional features are illustrated for the grounding connector 48 of FIGS. 1-6. Collectively or individually, these configurations or features can variously expand the versatility, and therefore utility, of the disclosed grounding connector 48. Although certain differences are noted below, discussion above regarding the connector 48 otherwise generally applies to the examples discussed below.

Figure 5:
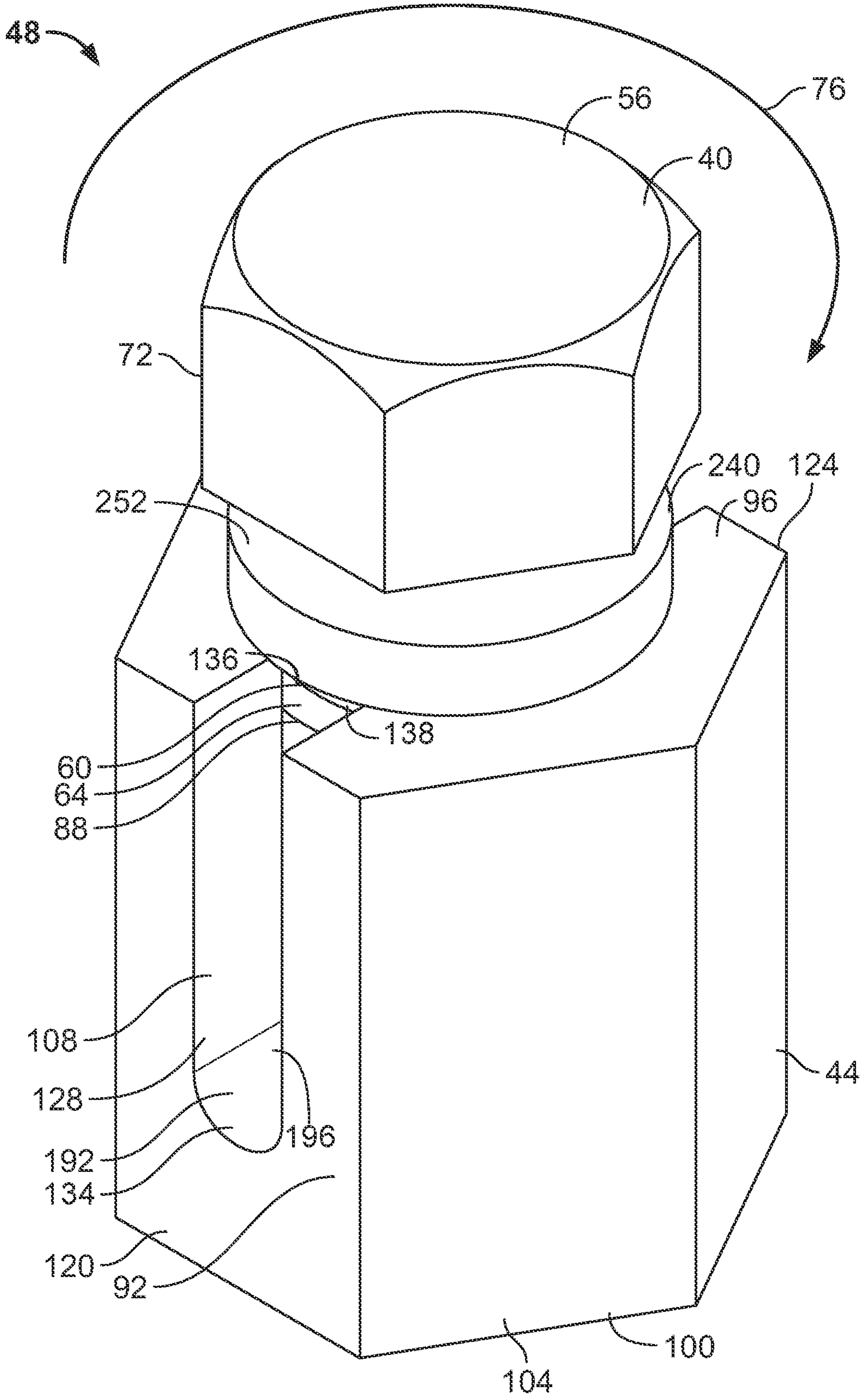
FIG. 5 is an isometric view of another configuration of the grounding connector of FIG. 1, with one or more caps secured to the shear bolt.
Figure 6:
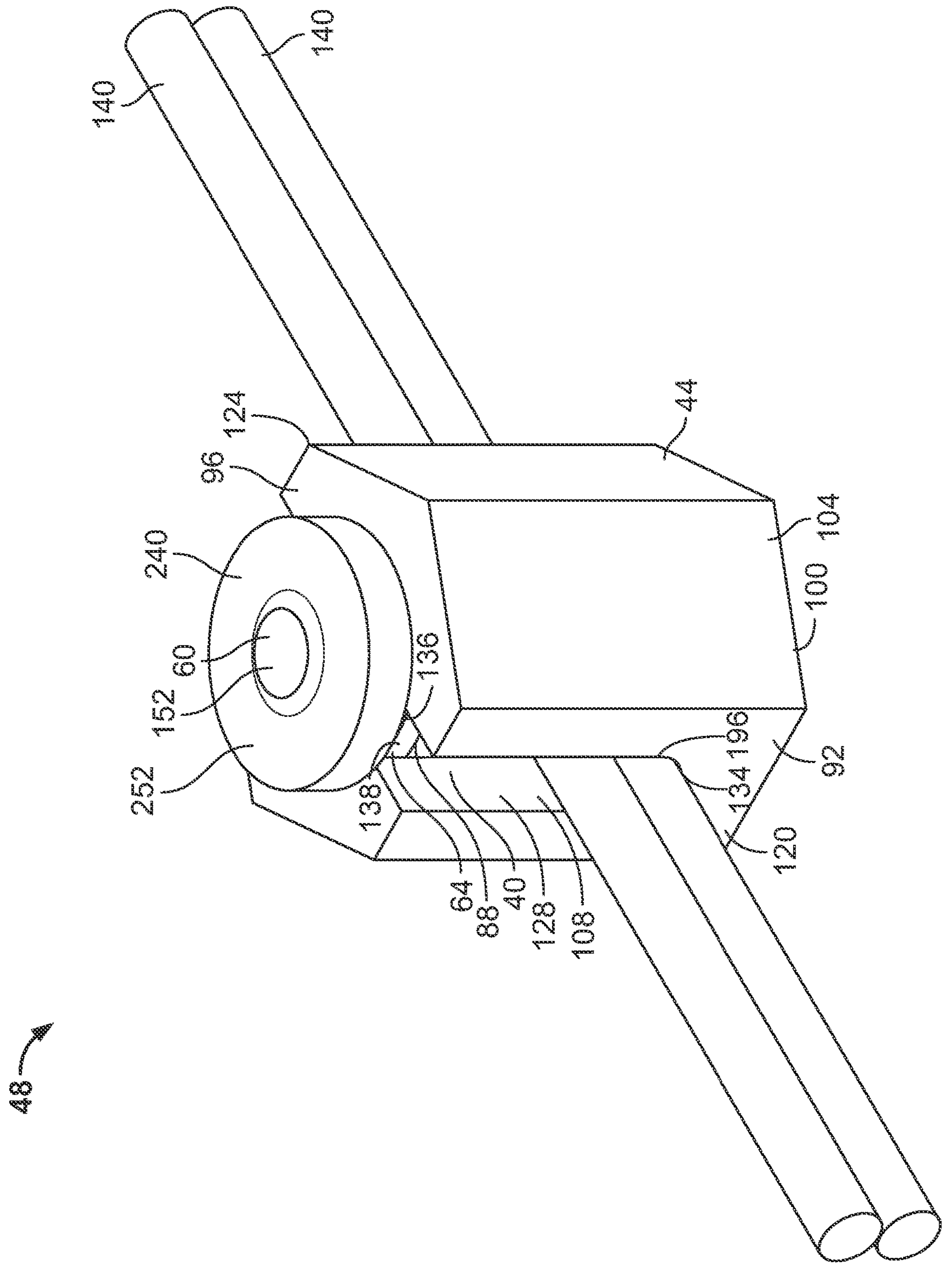
FIG. 6 is an isometric view of the grounding connector of FIG. 5 with the head removed, with two conductors installed in a grounded configuration.
Figure 7:
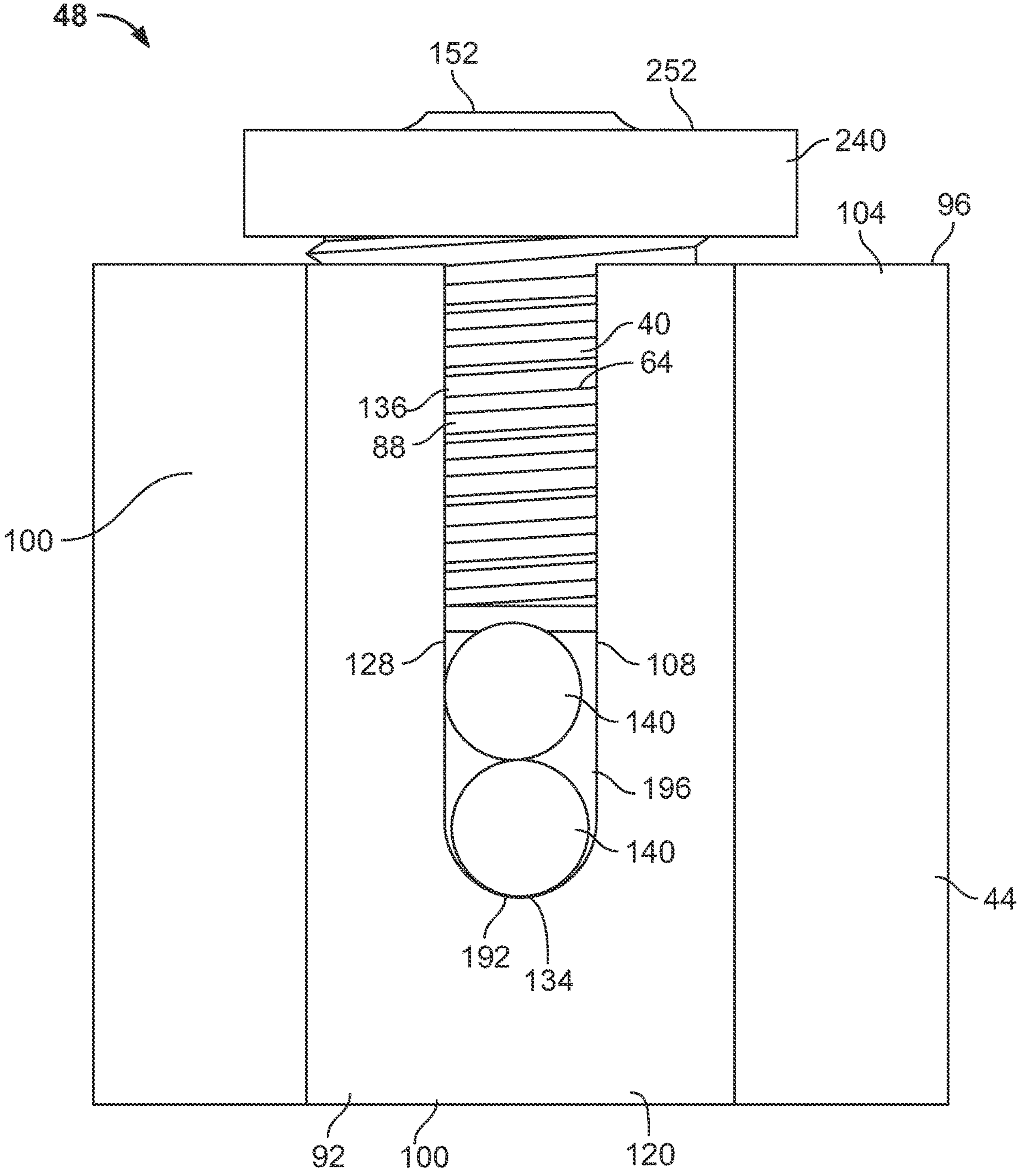
FIG. 7 is a side view of the grounding connector as configured in FIG. 6.

Regarding FIGS. 5-7, one or more positive stops formed as a cap (e.g., a washer) 240 may be secured to the body 64 of the shear bolt 40 (see FIG. 7). The one or more caps 240 have an outer diameter that may be sufficiently large to be unable to enter the cavity 136 of the recess 108. When the shear bolt 40 is in the pre-shear position, the one or more caps 240 may be secured to the body 64, and positioned between the head 56 and the first end 96 (see FIG. 5). The shear bolt 40 can then be advanced to retain the one or more conductors 140 in the recess 108 (see FIGS. 6 and 8) such that the head 56 is sheared off near the cap 240. As a result, the shear surface 152 that contacts the shear bolt 40 may project very little (or not at all) above an upper surface 252 of the cap 240 that is proximate or closest to the head 56 (before the head 56 is sheared off). Therefore, the cap 240 may protect the shear surface 152 (see FIGS. 6, 7) and further increase the irreversibility of the grounding connection. In some examples, the cap 240 may prevent the shear bolt 40 from being over inserted into the cavity 136 and potentially harming the one or more conductors 140 in the recess 108.

Figure 8:
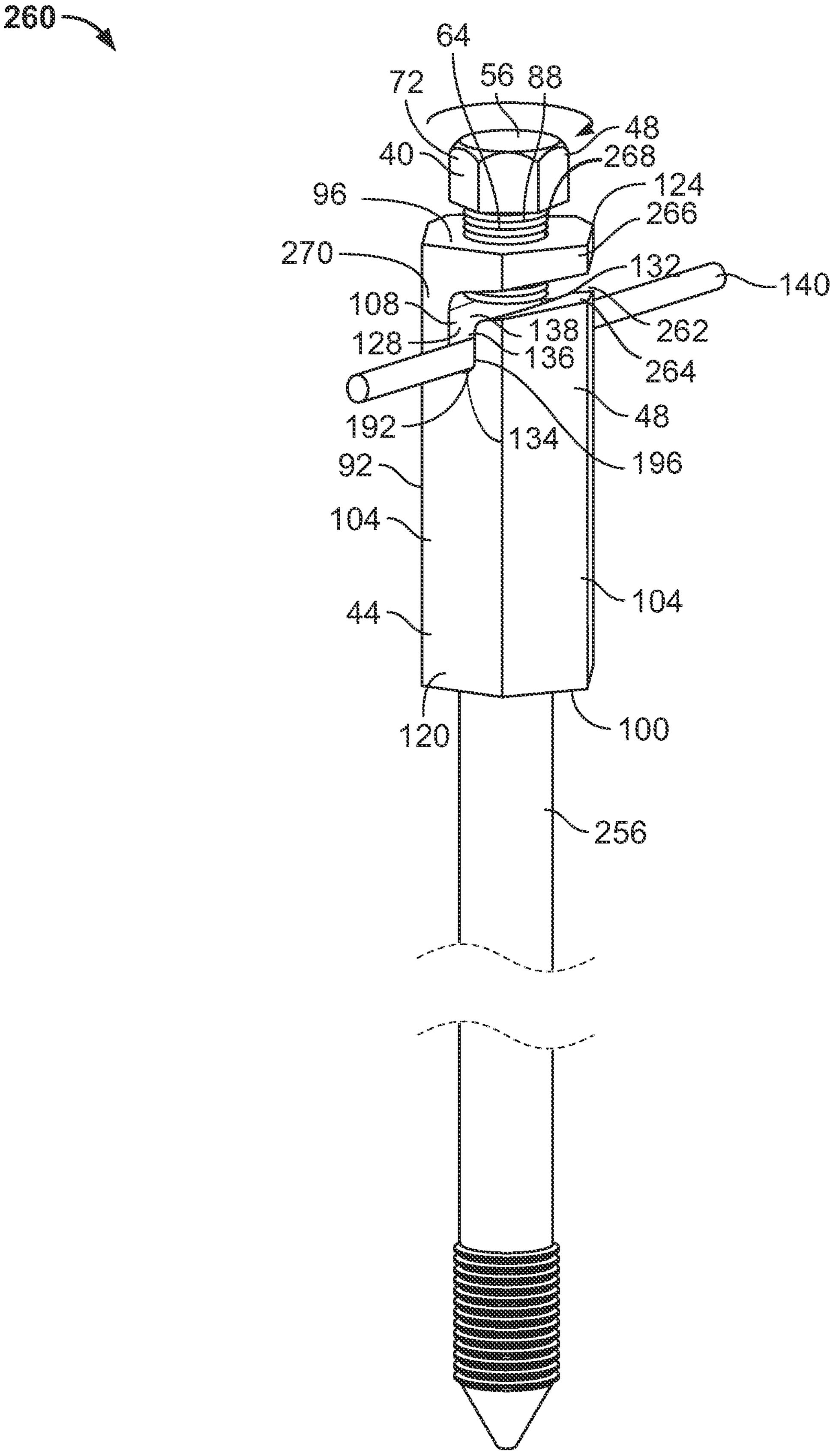
FIG. 8 is an isometric view of another example grounding connector according to the disclosed technology, forming part of a grounding assembly that includes a grounding rod.

Referring to FIG. 8, in some examples, the grounding connector 48 may engage a grounding rod 256 to form a grounding assembly 260. In some cases, the connector body 44 may be configured to be secured to the grounding rod 256 with a threaded engagement. In this regard, in some examples, the second end 100 of the connector body 44 may include a threaded anchor portion (internal thread not shown in FIG. 8) that may threadedly engage the grounding rod 256 at a threaded end portion (external thread not shown) of the grounding rod 256. In some examples, the grounding rod 256 may segmented to include a plurality of threaded grounding rod sections.

In other examples, other configurations are possible. For example, some grounding bodies can be included as part or can be configured to connect to a point grounding rod. As another example, a grounding body need not necessarily be aligned in parallel with a primary elongate axis of a grounding rod or other associated component. For example, a grounding body can be threaded into or otherwise engaged with another grounding component with a rotational axis for a shear bolt, or an insertion direction for a wire, that is perpendicular (or otherwise transverse) to an elongate direction of the grounding component (e.g., with the grounding body extending radially outwardly from a grounding rod).

Still referring to FIG. 8, in some examples, the connector body 44 may include the recess 108 that includes the first recess opening 128, the second recess opening 132, and the cavity 136. In some examples, the recess 108 may include a lay-in slot 262 configured to receive the one or more conductors 140. The lay-in slot 262 may include a lay-in entrance 264 that is disposed on (and opens toward) a lateral side of the connector body 44 relative to the axial direction. In some examples, the lay-in entrance 264 may define an insertion direction that is substantially perpendicular to one or more of the sidewalls 196 of the recess 108. In some examples, an insertion direction defined by the lay-in entrance 264 may not be substantially perpendicular to one or more of the sidewalls 196 of the recess 108. The lay-in slot 262 may extend from the lay-in entrance 264 to the first recess opening 128 and the second recess opening 132.

Thus, the lay-in slot 262 may be configured to allow one or more of the conductors 140 to be inserted or laid-into the recess 108 in a direction that is transverse to the axial direction. In some examples, the lay-in slot 262 may be only partly coextensive with the recess along the axial direction.

To partly define the lay-in slot 262, an overhang portion 266 may extend axially above the recess 108 and the lay-in entrance 264. In some examples, the overhang portion 266 may have a cross-sectional shape that is substantially identical to the cross-sectional shape of the connector body 44 (e.g., hexagonal). In some examples, the overhang portion 266 may have a cross-sectional shape that is not substantially identical to the cross-sectional shape of the connector body 44. In some examples, the overhang portion 266 is cantilevered, and may be supported by a support portion 270. In some examples, the support portion 270 may extend axially from the connector body 44 on a side that is laterally opposite of the lay-in entrance 264.

In some examples, the overhang portion 266 may include a threaded aperture 268. In some examples, the threaded aperture 268 may be axially aligned with the cavity 136 of the recess 108 (i.e., spaced apart from the cavity 136 so that a threaded bolt received through the aperture 268 is aligned to be received axially into the cavity 136). Thus, for example, the shear bolt 40 may be threadedly inserted into and retained by the threaded aperture 268 and, with sufficient axial insertion, also by internal thread of the cavity 136. In some examples, however, the cavity 136 may not include the second internal thread 139 and only the threaded aperture 268 may threadedly engage and retain the shear bolt 40. In either case, the shear bolt 40 may be inserted into the connector body 44 (e.g., tightened using hand tools) via the threaded aperture 268 of the overhang portion 266 to retain the one or more conductors 140 in the recess 108 between the shear bolt 40 and the connector body 44. With the one or more conductors 140 in place, the shear bolt 40 can be tightened to secure the one or more conductors 140, including by shearing off the head 56 at the predetermined torque.

In some examples, the staged orientation of the shear bolt 40 may include the shear bolt secured to the threaded aperture 268 (e.g., as shown in FIG. 8). In some examples, the shear bolt 40 in the staged orientation, may be secured to the threaded aperture 268 such that a bottom of the shear bolt 40 does not extend or extends very little axially below the overhang portion 266. The shear bolt 40 in the staged orientation may not extend or extend very little into the lay-in slot 262 (e.g., by a sufficiently small to permit passage of a conductor of a particular diameter, as also shown in FIG. 8). The staged orientation may therefore allow the installer to insert (lay-in) the one or more conductors 140 into the recess 108 through the lay-in entrance 264 while the shear bolt 40 is at least partially secured to the connector body 44 by the overhang portion 266. The staged orientation may also allow the installer to remove the one or more conductors 140 from the recess 108 through the lay-in entrance 264 while the shear bolt 40 is at least partially secured to the connector body 44.

Correspondingly, the assembly 260 of FIG. 8, can be sold as a pre-assembled kit (e.g., fully staged for installation, without loose parts). For example, the shear bolt 40 may be sold and transported to the field threadedly coupled to the connector body 44, reducing the risk of missing or mismatched parts. Conductors 140, and wires in general, can be stiff or unwieldly, the recess 108, lay-in slot 262, and overhang may retain the conductor 140 in both a vertical and an axial direction, allowing an installer to tighten the shear bolt 40 without the use of extra effort to maintain the conductor 140 within the lay-in slot 262. Relatedly, the lay-in slot 262 may be helpful when installing grounding connectors for one or more of the conductors 140 that have already themselves been installed in a larger assembly or system, as may make stab-through installation of the conductors difficult.

Figure 9:
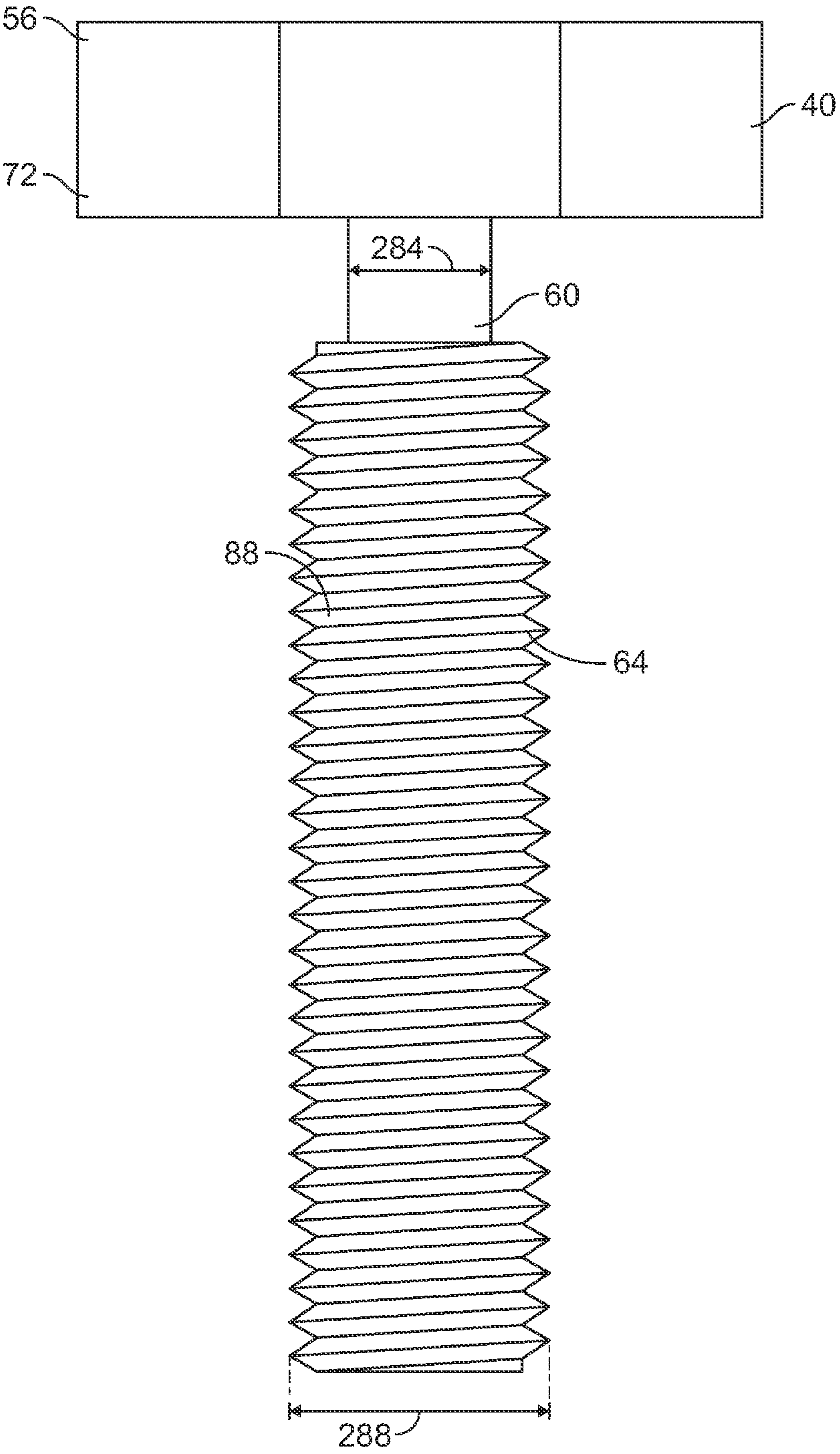
FIG. 9 is a side view of a shear bolt suitable for use in grounding connectors disclosed herein.

Referring to FIG. 9, the shear segment 60 of the shear bolt 40 can be configured to provide a more certain location for the shearing failure of the shear bolt 40. For example, the shear segment 60 can have a shear segment diameter 284 that is narrower than a shaft diameter 288 of the body 64. The shear segment 60 can be integrally formed with a narrower diameter, or the shear segment 60 can be subjected to a removal of material operation, such as cutting the shear bolt 40 on a lathe. When the shear bolt 40 in the pre-shear position is subjected to the rotational force 76, the shear segment 60 may shear more readily at the desired location since the shear segment diameter 284 is narrowed as compared to the body 64.

Figure 10:
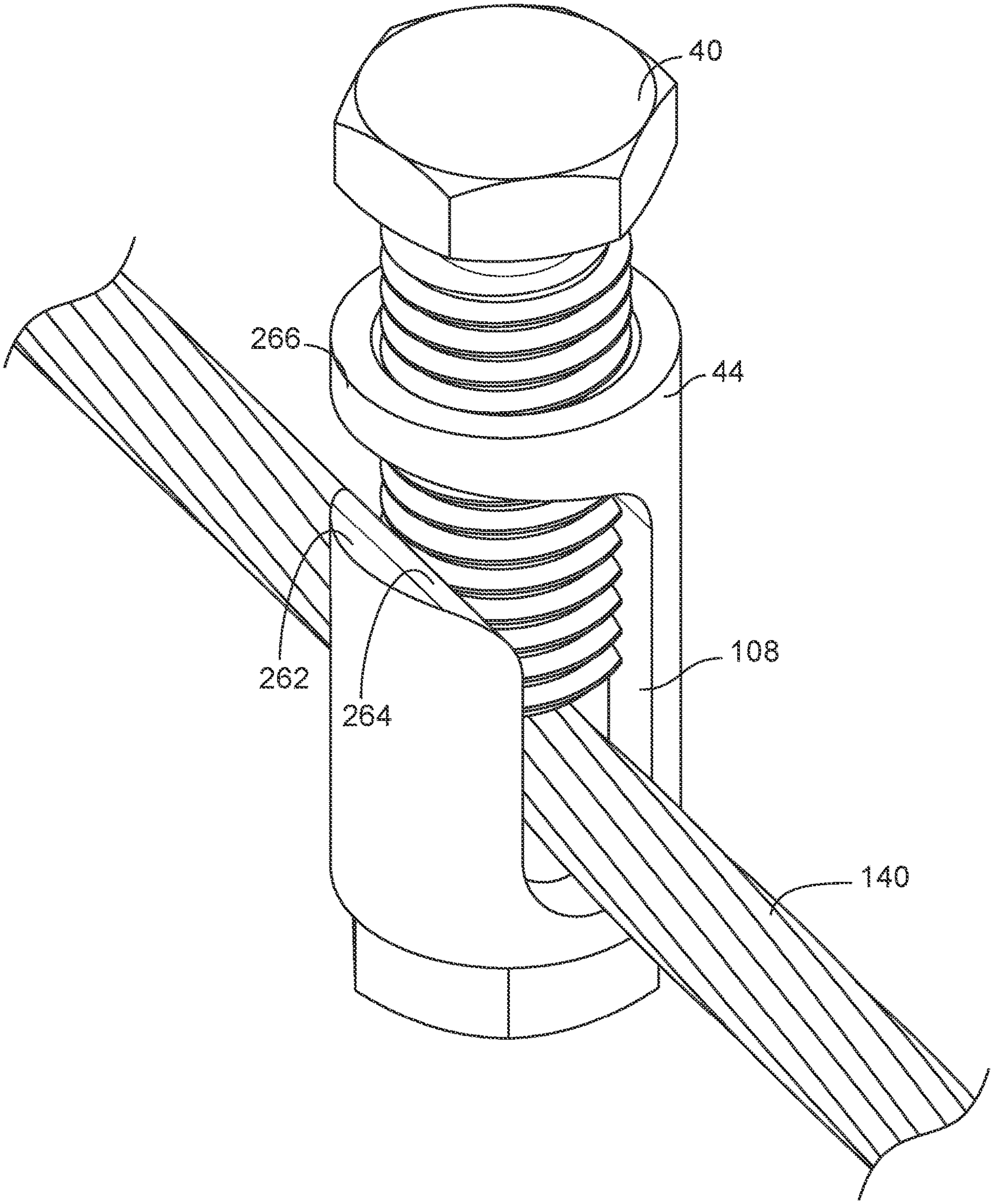
FIG. 10 is an isometric view of another example grounding connector according to the disclosed technology.

FIG. 10 illustrates an example of the connector body 44, including at least the recess 108, the lay-in slot 262, the lay-in entrance 264, and the overhang portion 266. Generally, the connector body 44 of FIG. 10 can function as the lay-in connector bodies 44 discussed above. However, in the present example, the connector body 44 may include more than one cross-sectional profiles. For example, FIG. 10 further illustrates that a cross-section of a bottom portion of the connector body 44 may be hexagonal in shape, while a cross-section of a central and top portion may be circular in shape. The top portion may include at least the overhang portion 266, and the overhang portion 266 can thus also have a circular cross-section. In other examples, the top, bottom, and central portion may be any other variety of shape (e.g., circular, hexagonal, trapezoidal, rectangular, triangular, etc.). In some embodiments, the cross-section of the top and central portions may be wider than the cross-section of the bottom portion. Thus, for example, the top and central portions may provide extra material to strengthen the connector body 44 overall.

Figure 11:
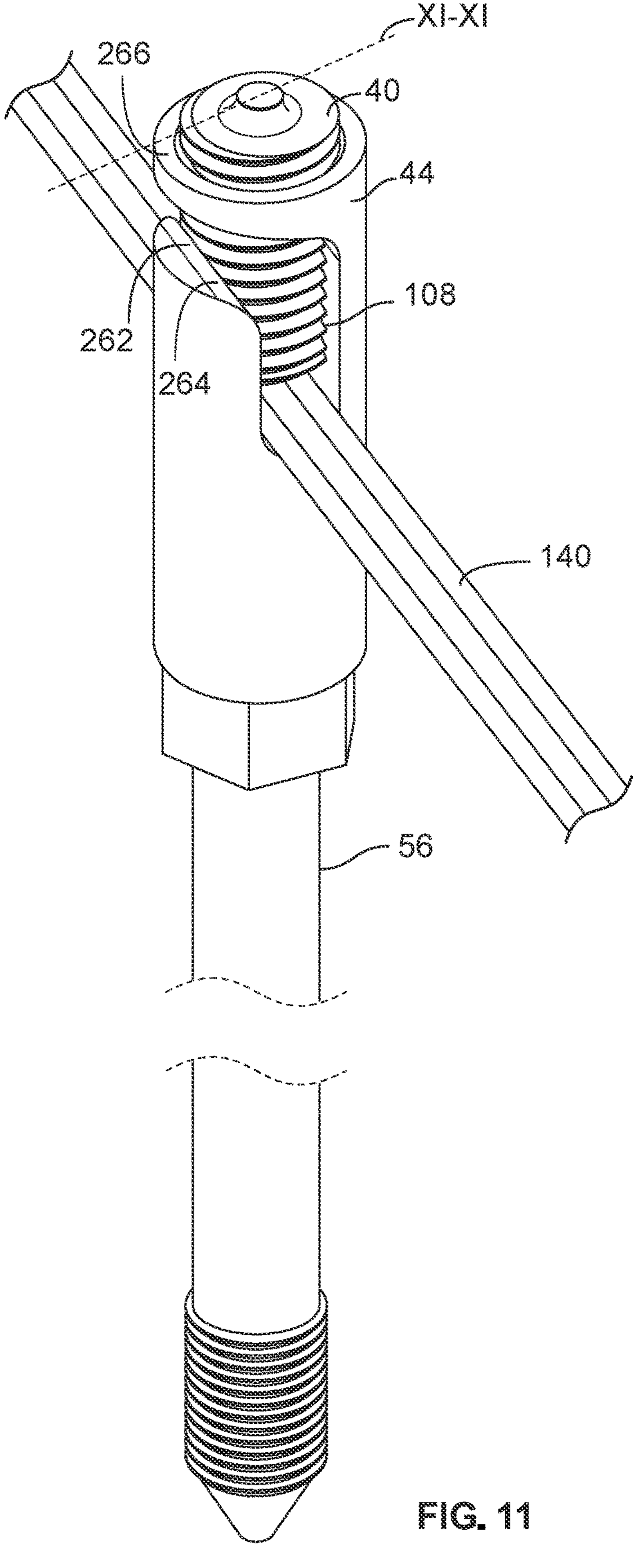
FIG. 11 is an isometric view of still another example grounding connector according to the disclosed technology, forming part of a grounding assembly that includes a grounding rod.
Figure 12:
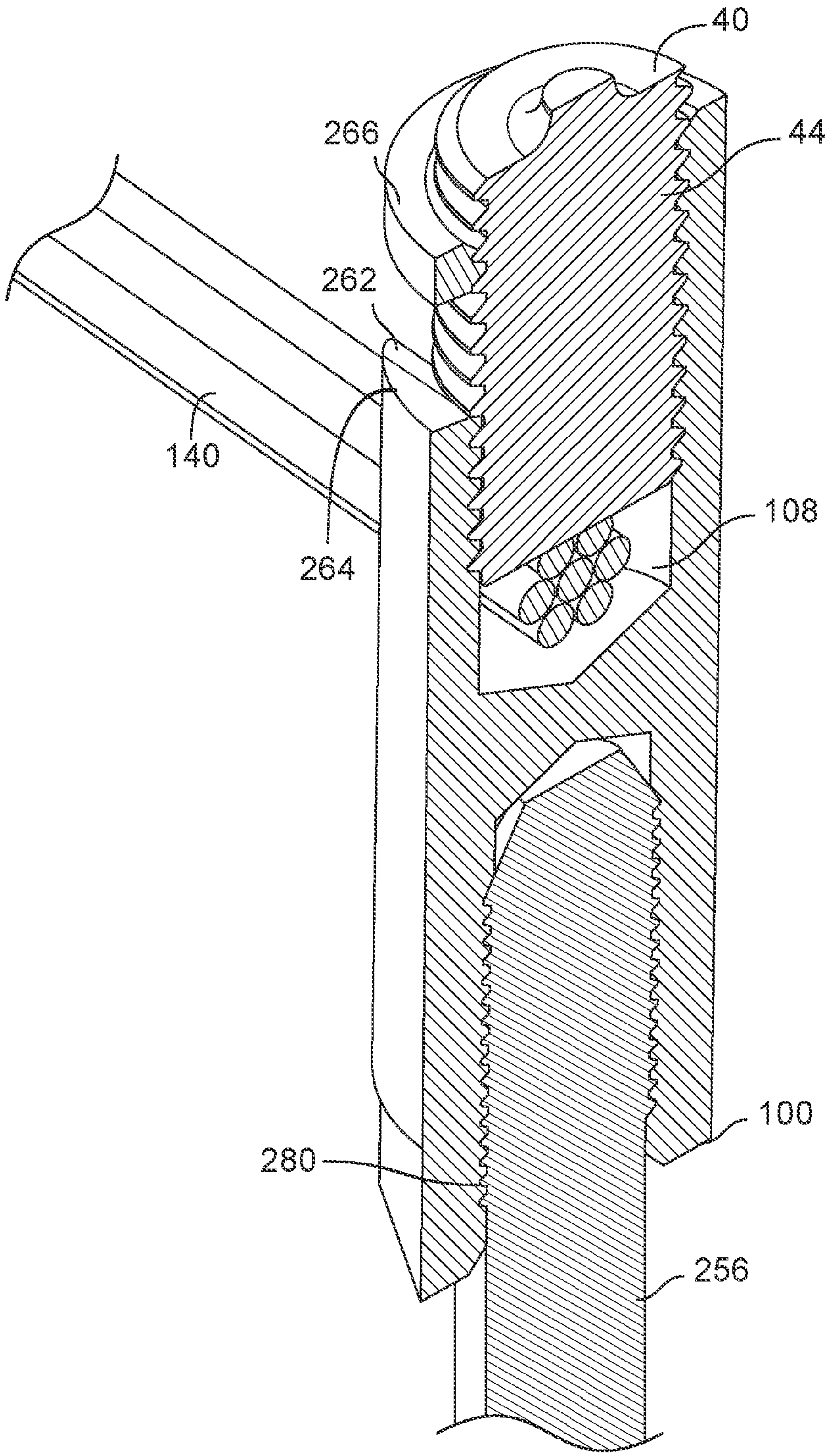
FIG. 12 is an isometric cross-sectional view of the grounding assembly of FIG. 11.

FIGS. 11 and 12 illustrate an embodiment of the connector body 44, including at least the recess 108, the lay-in slot 262, the lay-in entrance 264, and the overhang 266. Similar to the example of FIG. 10, the connector body 44 of FIG. 11 may include the more than one cross-sectional profiles. The connector body 44 may further include a rod aperture 280 configured to receive the rod 256. The rod aperture may extend axially opposite the threaded aperture that receives the shear bolt 40, such that the rod 256 may be received into (and extend from) the end 100 of the connector body 44. Thus, as illustrated in FIG. 12, the rod aperture 280 may threadedly receive the rod 256, to provide a grounding connection between the conductors 140 and the rod 256.

Thus, some embodiments of the invention can provide improved grounding connectors. For example, through the use of shear bolts, grounding connectors can be configured for more reliable, more secure, and easier installation than conventional designs.

The term "about," as used herein, refers to variation in the numerical quantity that may occur, for example, through typical measuring and manufacturing procedures used for articles of manufacture that may include examples of the disclosed technology; through inadvertent error in these procedures; through differences in the manufacture, source, or purity of the ingredients used to make the compositions or mixtures or carry out the methods; and the like. Throughout the disclosure, the terms “about” and “approximately” refer to a range of values ±5% of the numeric value that the term precedes.

Also as used herein, unless otherwise limited or defined, “or” indicates a non-exclusive list of components or operations that can be present in any variety of combinations, rather than an exclusive list of components that can be present only as alternatives to each other. For example, a list of “A, B, or C” indicates options of: A; B; C; A and B; A and C; B and C; and A, B, and C. Correspondingly, the term “or” as used herein is intended to indicate exclusive alternatives only when preceded by terms of exclusivity, such as “either,” “one of,” “only one of,” or “exactly one of” For example, a list of “one of A, B, or C” indicates options of: A, but not B and C; B, but not A and C; and C, but not A and B. A list preceded by “one or more” (and variations thereon) and including “or” to separate listed elements indicates options of one or more of any or all of the listed elements. For example, the phrases “one or more of A, B, or C” and “at least one of A, B, or C” indicate options of: one or more A; one or more B; one or more C; one or more A and one or more B; one or more B and one or more C; one or more A and one or more C; and one or more of A, one or more of B, and one or more of C. Similarly, a list preceded by “a plurality of” (and variations thereon) and including “or” to separate listed elements indicates options of multiple instances of any or all of the listed elements. For example, the phrases “a plurality of A, B, or C” and “two or more of A, B, or C” indicate options of: A and B; B and C; A and C; and A, B, and C.

Also as used herein, unless otherwise limited or defined, “integral” and derivatives thereof (e.g., “integrally”) describe elements that are manufacture as a single piece without fasteners, adhesive, or the like to secure separate components together. For example, an element stamped as a single-piece component from a single piece of sheet metal, without rivets, screws, or adhesive to hold separately formed pieces together is an integral (and integrally formed) element. In contrast, an element formed from multiple pieces that are separately formed initially then later connected together, is not an integral (or integrally formed) element.

Also as used herein, unless otherwise defined or limited, the term “lateral” refers to a direction at least a component of which does not extend in parallel with a reference direction. In some cases, a lateral direction can be a radial (i.e., perpendicularly outward) direction relative to an axis that extends in a reference direction. In some cases, a lateral direction can be perpendicular or substantially perpendicular to a reference direction.

Also as used herein, unless otherwise limited or defined, “substantially parallel” indicates a direction that is within ±12 degrees of a reference direction. Similarly, “substantially perpendicular” indicates a direction that is within ±12 degrees of perpendicular to a reference direction. For a path that is not linear, whether or not the path is substantially parallel (or perpendicular) to a reference direction if an end-point to end-point line of the path is substantially parallel (or perpendicular) to the reference direction or of a mean derivative of the path within a common reference frame as the reference direction is substantially parallel (or perpendicular) to the reference direction.

Also as used herein, unless otherwise defined or limited, “substantially identical” refers to two or more components, systems, or shapes that are manufactured or used according to the same process and specification, with variation between the components, systems, or shapes that are within the limitations of acceptable tolerances for the relevant process or specification. For example, two components can be considered to be substantially identical—or to have substantially identical shapes—if the components are manufactured according to the same standardized manufacturing steps, with the same materials, and within the same acceptable dimensional tolerances (e.g., as specified for a particular process or product).

In some implementations, devices or systems disclosed herein can be utilized, manufactured, installed, etc. using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A grounding connector assembly, comprising:

a connector body that includes a recess extending in an axial direction from a blind end, and an internal thread extending in the axial direction, the connector body defining a first cross-sectional profile taken perpendicular to the axial direction, the first cross-sectional profile being a first hexagonal profile, the recess opening to a lateral side of the connector body, relative to the axial direction, to define a lay-in entrance to receive one or more conductors into the recess in an insertion direction that is transverse to the axial direction; and a shear bolt engaged with the internal thread of the connector body in axial alignment with the recess, to be threadedly movable into the recess to engage the one or more conductors;

the shear bolt having a shear torque at which a hexagonal head of the shear bolt is configured to shear from a body of the shear bolt, the shear torque corresponding to a target compression force between the shear bolt and the one or more conductors when the shear bolt is tightened into the internal thread of the connector body so that the body of the shear bolt retains the one or more conductors at the blind end of the recess.

2. The grounding connector assembly of claim 1, wherein the recess is formed as a slot that extends into the connector body and includes: a first portion that extends parallel to the axial direction, a bend, and a second portion that extends laterally from the bend to the lateral side of the connector body and the lay-in entrance.

3. The grounding connector assembly of claim 2, wherein the slot is intersected by the internal thread and exhibits a first width that is smaller than an inner diameter of the internal thread.

4. The grounding connector assembly of claim 3, wherein the slot extends axially away from the lay-in entrance past an axial end of the internal thread.

5. The grounding connector assembly of claim 1, wherein the connector body integrally includes a conductor portion that at least partly includes the recess and an overhang portion that is on an axially opposite side of the lay-in entrance than is the conductor portion.

6. The grounding connector assembly of claim 5, wherein the overhang portion includes the internal thread.

7. The grounding connector assembly of claim 6, wherein the internal thread of the overhang portion extends over an axial length to secure the shear bolt to the connector body in a staged orientation, in which the shear bolt is oriented to permit the one or more conductors to be inserted into or removed from the recess via the lay-in entrance.

8. The grounding connector assembly of claim 7, wherein conductor portion also includes the internal thread.

9. The ground connector assembly of claim 5, wherein, a cross-sectional profile of the overhang portion, taken perpendicular to the axial direction, is substantially identical to a cross-sectional profile of the conductor portion, taken perpendicular to the axial direction.

10. The grounding connector assembly of claim 1, wherein the connector body defines a second cross-sectional profile taken perpendicular to the axial direction, the second cross-sectional profile being a circular profile and being located axially between the first hexagonal profile and the hexagonal head of the shear bolt.

11. The grounding connector assembly of claim 1, wherein the shear bolt further includes a cap between the body and the hexagonal head, the cap extending laterally by farther than the internal thread to provide a stop against over-insertion of the shear bolt into the recess.

12. The grounding connector assembly of claim 1, wherein the connector body is secured to a grounding rod that extends axially from the connector body in an opposite direction than the shear bolt.

13. The grounding connector assembly of claim 12, wherein the connector body is threadedly connected to the grounding rod.

14. A grounding connector assembly, comprising:

a grounding rod;

a connector body engaged at a first end with the grounding rod and including, at a second end, a threaded portion extending in an axial direction, and a recess sized to receive one or more conductors, the recess opening out of the connector body in a lateral direction, relative to the axial direction; and a shear bolt engaged with the threaded portion of the connector body to secure the one or more conductors within the recess, a head of the shear bolt being configured to shear from a body of the shear bolt at a target compression force between the shear bolt and the one or more conductors to retain the one or more conductors within the recess.

15. The grounding connector assembly of claim 14, wherein the recess is formed as a slot that extends into the connector body, including: a first portion that extends parallel to the axial direction to define slot openings at opposing lateral sides of the connector body; and a second portion that extends laterally from the first portion to a lay-in entrance.

16. The grounding connector assembly of claim 14, wherein the connector body exhibits a circular cross-section along the recess and a hexagonal cross-section at an end axially opposite from the head of the shear bolt.

17. The grounding connector assembly of claim 14, wherein the recess defines a lay-in opening in the lateral direction to receive the one or more conductors; and wherein the second end of the connector body extends axially past the lay-in opening and includes at least part of the threaded portion.

18. The grounding connector assembly of claim 17, wherein the threaded portion at the second end of the connector body is cantilevered to be in axial alignment with the recess.

19. A method of establishing a grounding connection, the method comprising:

providing a connector body that includes a recess extending in an axial direction from a blind end, and an internal thread extending in the axial direction, at least a portion of the connector body defining a hexagonal cross-sectional profile, taken perpendicular to the axial direction, the recess opening to a lateral side of the connector body, relative to the axial direction, to define a lay-in entrance;

inserting one or more conductors laterally into the lay-in entrance in an insertion direction that is transverse to the axial direction;

moving the one or more conductors axially within the recess to seat the one or more conductors at a blind end of the recess;

tightening a shear bolt into the internal threads of the connector body, including by engaging the shear bolt and the hexagonal cross-sectional profile of the connector body, to threadedly move the shear bolt in the axial direction to engage the one or more conductors within the recess; and further tightening the shear bolt to a shear torque, to shear a head of the shear bolt from a body of the shear bolt, the shear torque corresponding to a target compression force between the shear bolt and the one or more conductors so that the body of the shear bolt retains the one or more conductors at the blind end of the recess.

20. The method of claim 19, wherein the shear bolt is retained by the internal thread of the connector body as the one or more conductors are inserted into the lay-in entrance.

* * * * *